United States Patent
Shkolnikov et al.

(10) Patent No.: US 9,794,364 B2
(45) Date of Patent: Oct. 17, 2017

(54) OPTIMIZING THE DELIVERY OF FORMATTED EMAIL MESSAGES

(75) Inventors: Pavel Shkolnikov, Waterloo (CA); Dimitri Mostinski, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1026 days.

(21) Appl. No.: 12/500,025

(22) Filed: Jul. 9, 2009

(65) Prior Publication Data

US 2010/0011076 A1    Jan. 14, 2010

Related U.S. Application Data

(60) Provisional application No. 61/079,367, filed on Jul. 9, 2008.

(51) Int. Cl.
| | | |
|---|---|---|
| *G06F 13/00* | (2006.01) | |
| *H04L 29/08* | (2006.01) | |
| *H04L 12/58* | (2006.01) | |
| *H04W 28/06* | (2009.01) | |
| *H04W 4/12* | (2009.01) | |

(52) U.S. Cl.
CPC ........ *H04L 67/2823* (2013.01); *H04L 51/066* (2013.01); *H04L 51/38* (2013.01); *H04L 67/2828* (2013.01); *H04W 28/06* (2013.01); *H04W 4/12* (2013.01)

(58) Field of Classification Search
CPC ............. H04L 12/5835; H04L 12/5895; H04L 51/066; H04L 67/2828; H04L 67/2823; H04L 51/38; H04W 28/06; H04W 4/12
USPC ........................ 709/230–236, 246, 204–206; 715/751–759
See application file for complete search history.

(56) References Cited

U.S. PATENT DOCUMENTS

| | | | | |
|---|---|---|---|---|
| 7,900,149 | B2* | 3/2011 | Hatcher ................ | H04L 51/066 715/234 |
| 8,051,372 | B1* | 11/2011 | Sandhaus ...................... | 715/234 |
| 8,126,976 | B2* | 2/2012 | Klassen et al. ............... | 709/206 |
| 8,483,727 | B2* | 7/2013 | Shkolnikov et al. .......... | 455/466 |
| 8,583,829 | B2* | 11/2013 | Natchetoi ......... | G06F 17/30905 709/246 |
| 9,633,336 | B2* | 4/2017 | Bartlett ................ | G06Q 10/107 |

(Continued)

FOREIGN PATENT DOCUMENTS

| | | |
|---|---|---|
| EP | 1675351 | 6/2006 |
| WO | 0039666 | 7/2000 |
| WO | 03088035 | 10/2003 |

OTHER PUBLICATIONS

Adrian Holovaty: "The content-to-code ratio", Nov. 7, 2002, p. 1-5, XP002544411.
European Search Report dated Sep. 7, 2009.

*Primary Examiner* — Kenneth R Coulter
(74) *Attorney, Agent, or Firm* — Ridout & Maybee LLP

(57) ABSTRACT

A method, server and system for the delivery of email messages is provided. In accordance with one embodiment, the method comprises: receiving a Markup Language email message, the email message including a displayable content portion and a markup portion; determining whether the markup portion of the email message is too large; if the markup is too large, extracting plain text portions of the email and obtaining a plain text email from the extracted plain text portions and transmitting the plain text email to the mobile communication device; and if the markup is not too large, transmitting the email to the mobile communication device.

21 Claims, 4 Drawing Sheets

(56) References Cited

U.S. PATENT DOCUMENTS

| | | | | |
|---|---|---|---|---|
| 2006/0143282 A1* | 6/2006 | Brown et al. | ................ | 709/217 |
| 2008/0307328 A1* | 12/2008 | Hatcher | ................ | H04L 51/066 |
| | | | | 715/760 |
| 2009/0300121 A1* | 12/2009 | Bartlett | ................ | G06Q 10/107 |
| | | | | 709/206 |

* cited by examiner

OPTIMIZING THE DELIVERY OF FORMATTED EMAIL MESSAGES

This application claims priority to and the benefit of U.S. Provisional Patent Application Ser. No. 61/079,367, filed Jul. 9, 2008, the contents of which are incorporated herein by reference.

TECHNICAL FIELD

The present disclosure relates generally to communication systems and, more particularly to a method, server and system for optimizing the delivery of email messages.

BACKGROUND

HyperText Markup Language (HTML) is a language that describes how text, or other content is structured, laid out, or formatted. Electronic messages, including email messages, sometimes use HTML to allow a sender of an email to include formatting, such as superscripts, emphasized text, bulleted lists, superscripts, and other visual and typographic prompts to enhance the readability and aesthetics of the email message.

Since even the most minimal HTML emails include some HTML markup, the size of such emails is larger than equivalent plain text emails which have the same substantive content but do not contain formatting. Accordingly, the transmission of HTML messages may require relatively large amounts of bandwidth. Several other formatting languages are known for use in marking up email and other messages; any of these can also require large amounts of bandwidth compared to content-equivalent plain-text messages.

Thus, there exists a need for methods, servers and systems for optimizing the delivery of email messages that use formatting language such as HTML.

BRIEF DESCRIPTION OF THE DRAWINGS

Like reference numerals are used in the drawings to denote like elements and features.

DETAILED DESCRIPTION OF EXAMPLE EMBODIMENTS

According to example embodiments, email messages including displayable content and markup content are checked to determine whether the markup content of the received email message exceeds a threshold. If the markup content exceeds the threshold, content is extracted from the received email message to obtain a reduced size email message having less markup content than the received email message and the reduced size email message is sent to a wireless communications device.

According to an aspect of the present disclosure, as will be explained in greater detail below, methods and systems are provided which consider the amount of markup in an email message 364 in order to determine an appropriate format to be used for transmitting the email message 364. That is, the wireless connector system 120 may determine whether the markup is too large to justify transmitting the email as an HTML email. As described more fully below, when the wireless connector system 120 determines that too much of the email is composed of markup, the wireless connector system 120 reverts to transmitting the email message as a plain text message.

Figure 1:
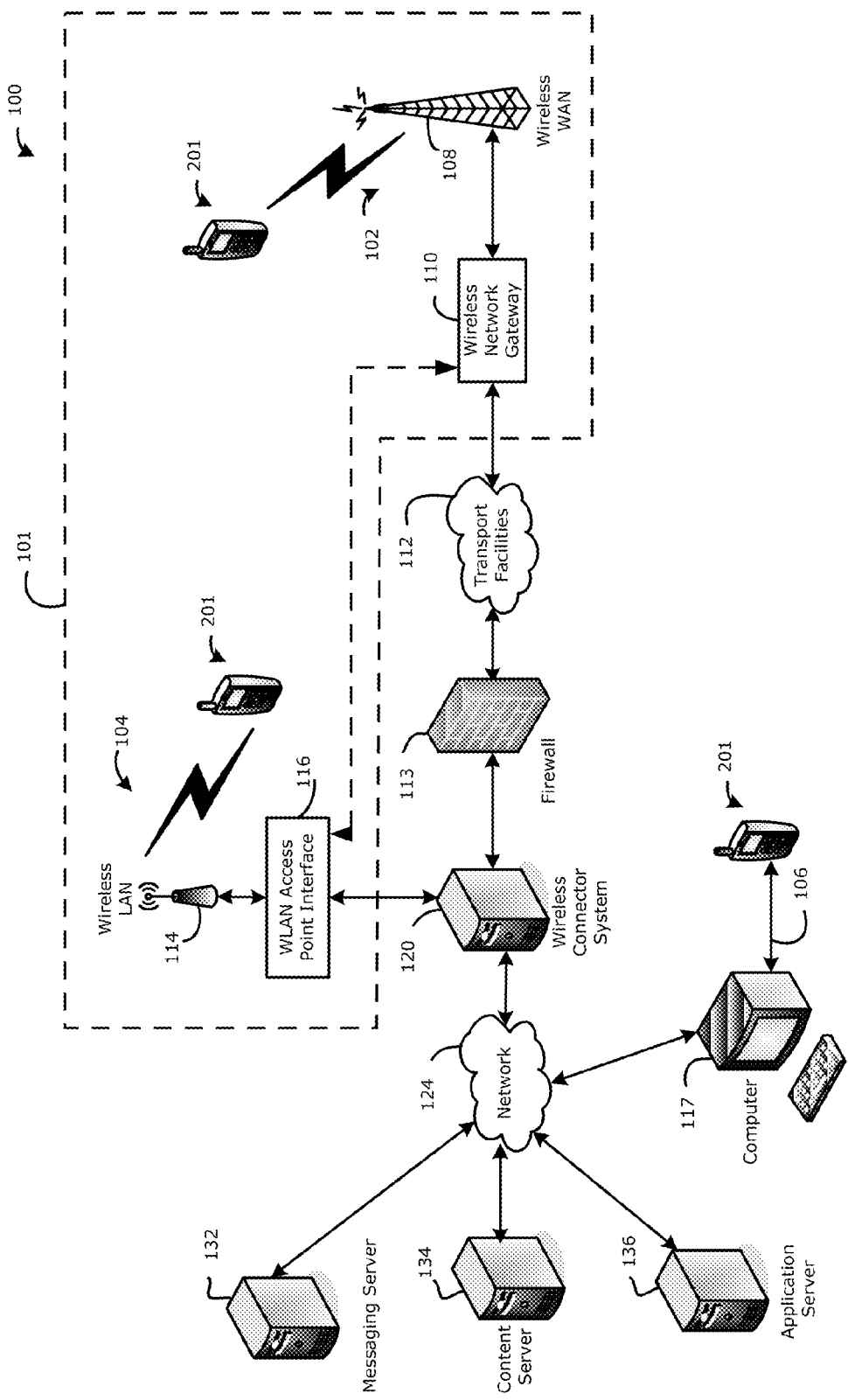
FIG. 1 is a block diagram illustrating a communication system including a mobile communication device to which system example embodiments of the present disclosure can be applied.

In order to facilitate an understanding of one possible environment in which example embodiments described herein can operate, reference is first made to FIG. 1 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), WiMax (Worldwide Interoperability for Microwave Access), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the internet rather than, or in addition to, an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as WI-FI) such as, for example, the IEEE 802.11a, 802.11b and/or 802.11g standards. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly, as shown with a broken line in FIG. 1 (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange, IBM Lotus Domino, or Novell GroupWise email server), a content server 134 for providing content such as internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132 or application servers 136. Conversely, the wireless connector system 120 sends data packets received, for example, from the messaging server 132 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132 and application server 136.

The network 124 may comprise a private local area network, metropolitan area network, wide area network, the public internet or combinations thereof and may include virtual networks constructed using any of these, alone, or in combination.

A mobile communications device 201 may alternatively connect to the wireless connector system 120 using a computer 117, such as desktop or notebook computer, via the network 124. A link 106 may be provided for exchanging information between the mobile communication device 201 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, FIREWIRE (also known as an IEEE 1394 interface) connection, or other serial data connection, via respective ports or interfaces of the mobile communication device 201 and computer 117. The short-range wireless communication interface may be a personal area network (PAN) interface. A Personal Area Network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present disclosure.

In example embodiments, the mobile communication device 201 is a two-way communication device having at least data and possibly also voice communication capabilities, and the capability to communicate with other computer systems, for example, via the public internet. Depending on the functionality provided by the mobile communication device 201, in various embodiments the device may be, by way of example but not limitation, a data communication device, a multiple-mode communication device configured for both data and voice communication, a mobile telephone, a PDA (personal digital assistant) enabled for wireless communication, a smart phone, or a laptop computer with a wireless modem.

In some embodiments, the mobile communication device 201 is a handheld electronic device which includes a rigid case (not shown) for housing components of the device 201 and is configured to be held with one or two hands while the device 201 is in use. In some embodiments, the handheld electronic device is small enough to fit inside a purse or coat pocket or belt mounted holster.

Figure 2:
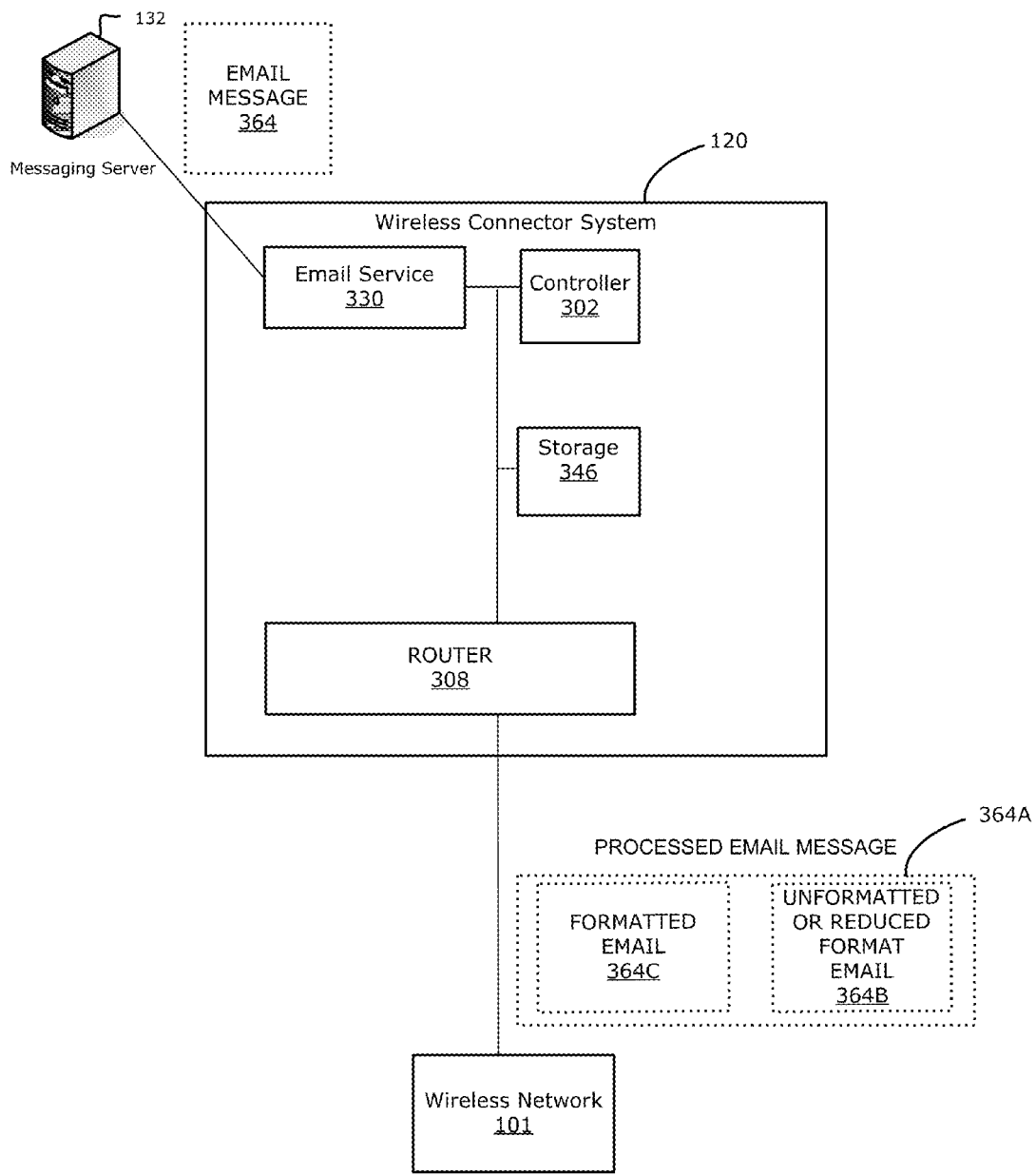
FIG. 2 is a block diagram illustrating a wireless connector system in accordance with one embodiment of the present disclosure.

Referring now to FIG. 2, the wireless connector system 120 for use in accordance with one embodiment of the present disclosure will now be described in more detail. The wireless connector system 120 may be implemented using any known general purpose computer technology, and may, for example, be realized as one or more microprocessor-based server computers implementing one or more server applications configured for performing the processes and functions described herein. The wireless connector system 120 is configured to implement a number of components or modules, including by way of non-limiting example, a controller 302, a router 308 and an email service 330. The wireless connector system may include more of or fewer than the modules listed above. In one example embodiment, the wireless connector system 120 includes one or more microprocessors that operate under stored program control and execute software to implement these modules. The software may for example be stored in memory such as persistent memory.

Controller 302 monitors the various components or modules of the wireless connector system and restarts them if they stop working. Router 308 connects to the wireless network 101 to send data to and from mobile communication devices 201. Email service 330 connects to messaging server 132 to provide messaging services, including processing message attachments that are sent to mobile communication devices 201.

The controller 302, email service 330, and router 308 modules may, among other things, each be implemented through stand-alone software applications, or combined together in one or more software applications, or as part of another software application. In some embodiments, the functions performed by each of the above identified modules may be realized as a plurality of independent elements, rather than a single integrated element, and any one or more of these elements may be implemented as parts of other software applications.

Together with the other modules described above, the email service 330 configures the wireless connector system 120 to perform, at least in part, the functions of a mobile email server and in this regard the wireless connector system 120 receives email messages 364 from messaging server 132, processes the received email messages for sending to mobile communication devices 201 in wireless network 101, and then sends the processed email messages 364A to the recipient devices 201. In one example embodiment the wireless connector system 120 is configured for receiving HyperText Markup Language (HTML) formatted email messages 364, processing the email messages for delivery to one or more of the mobile communication devices 201, and sending the processed email messages 364A to the destination mobile communication devices 201.

An email message such as a message in a form defined by Request For Comment (RFC) 822, comprises a header which includes a number of header lines or fields, and a message body. As defined in the MIME (Multipurpose internet Mail Extensions) standard, email messages may comprise multiple parts, including attachments, all of which can be sent together as a single message. This type of message is signalled by the term "multipart" in a MIME content-type header. Some email messages include content expressed in a formatting language, such as (without limitation), RTF or HTML. An HTML email message contains HTML content within the body of the message. The HTML content is located within an HTML portion of the message body, and may for example comprise an HTML head section and HTML body section. The HTML head section is denoted using the tags <head> and </head> to mark the start and end of the HTML head section, respectively. The HTML body section is denoted using the tags <body> and </body> to mark the start and end of the HTML body section, respectively. The body of an HTML email can refer to files, attachments, or the like (hereafter, "content items") that are to be included in the email message when it is displayed at a receiving device. For example, an HTML email can include a link to a file or other content item that includes inline content for the email, such as a .GIF file containing binary graphic image data, for example, that is denoted by an <img> tag within an HTML body. The head section may also reference files, documents, or other objects, such as the document type definition ("DTD") or a cascading style sheet ("CSS") for example, which may include matter which is not explicitly displayed in an email or pushed to a mobile communication device 201 but which is necessary to correctly interpret or display message or attachment content, and therefore may affect what is pushed to the mobile communication device 201.

HTML formatted emails allow a sender of an email to include formatting, such as superscripts, emphasized text, bulleted lists, superscripts, and other visual and typographic prompts to enhance the readability and aesthetics of the email message. To provide for such formatting, HTML emails include markup to indicate how the contents of the email should look when they are displayed or to describe the document's logical structure. Since even the most minimal HTML emails include some HTML markup, the size of such emails is larger than equivalent plain text emails which have the same substantive, non-markup, or displayable content but do not contain formatting. In some cases, the size of the markup in the email message 364 may greatly outweigh the size of the substantive, non-markup, or displayable content of the email message 364.

According to an aspect of the present disclosure, as will be explained in greater detail below, methods and systems are provided which consider the amount of markup in an email message 364 in order to determine an appropriate format to be used for transmitting the email message 364. That is, the wireless connector system 120 may determine whether the markup is too large to justify transmitting the email as an HTML email. As described more fully below, when the wireless connector system 120 determines that too much of the email is composed of markup, the wireless connector system 120 reverts to transmitting the email message as a plain text or reduced formatted email message 364B. Accordingly, as described more fully below, the processed email message 364A may be either a reduced formatted email message 364B or a formatted email message 364C. Whether the processed email message 364A is a reduced formatted email message 364B or a formatted email message 364C will depend on the amount of markup in the email message 364. The reduced formatted email message 364C contains less formatting than a formatted email message 364B obtained from the same original email message 364.

The wireless connector system 120 includes an email service 330 which is configured to carry out the optimization processes described herein. The email service 330 may include instructions for execution by a microprocessor for receiving HyperText Markup Language (HTML) formatted email messages 364, optimizing the email messages for delivery to one or more of the mobile communication devices 201, and transmitting (sending) the processed messages 364A to the destination mobile communication devices 201. The email service 330 may, among other things, be a stand-alone software application, part of an operating system, or part of another software application. In some embodiments, the functions performed by email service 330 may be realized as a plurality of independent elements, rather than a single integrated element, and any one or more of these elements may be implemented as parts of other software modules, elements, or components. Furthermore, in some embodiments, at least some of the functions performed by the email service 330 may be implemented in firmware of the wireless connector system 120. Finally, although the email service 330 is described, in connection with one embodiment, as a part of the wireless connector system 120, it could in other embodiments be realized, either as an independent server or as part of a multiple-function server, other than wireless connector system 120, but operatively coupled or connected thereto. Thus, as henceforth further referenced and claimed herein, unless otherwise specified, email service 330 shall denote both the program instructions (whether software or firmware) and those portions of any hardware elements necessary to execute such instructions at any particular time, and shall be considered to be operatively coupled to the controller part of wireless connector system 120 whether those instructions are executed on wireless connector system 120 or on some other server.

Figure 3:
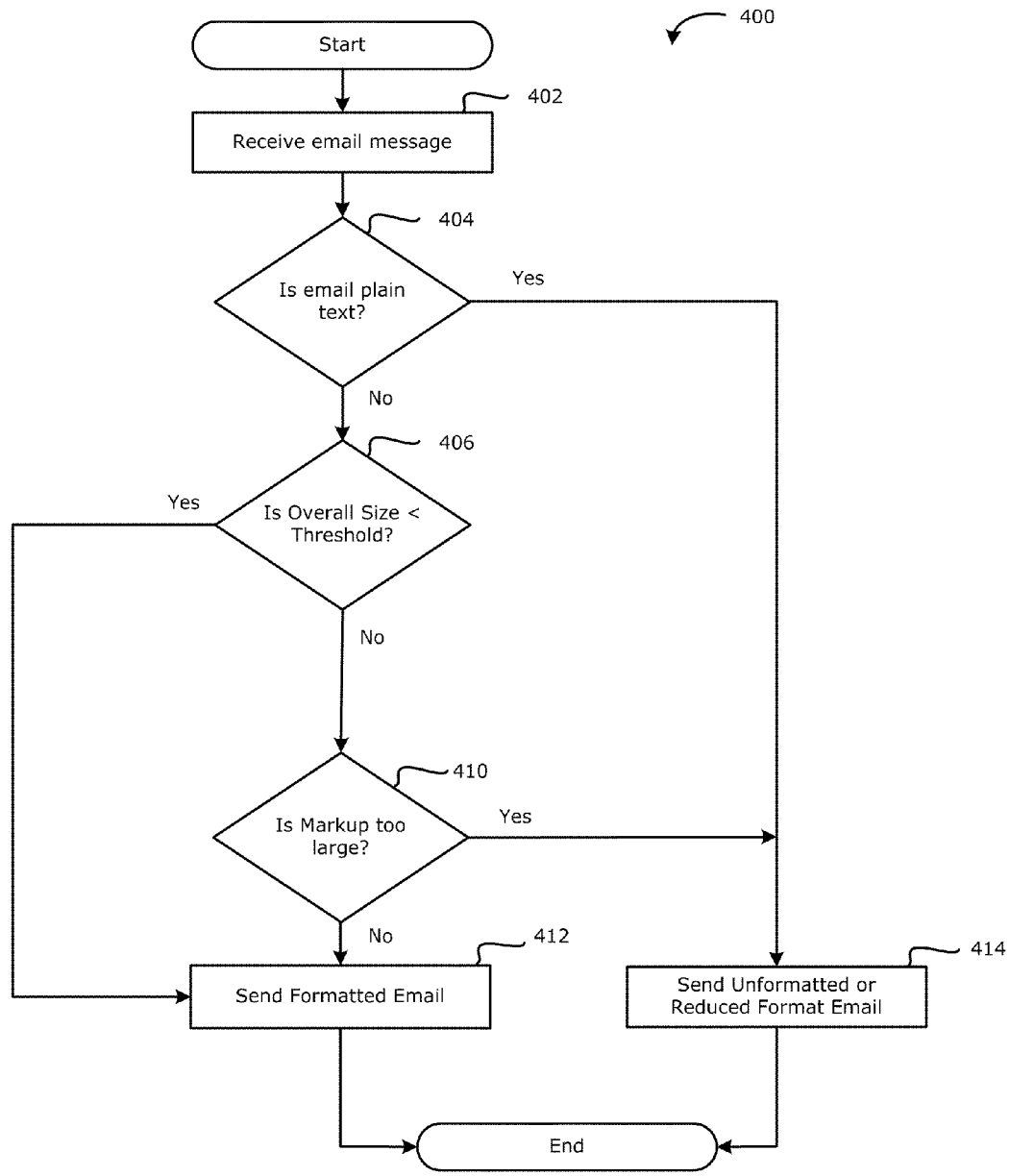
FIG. 3 is a flowchart illustrating a process for optimizing the delivery of email messages such as HTML based email messages in accordance with one embodiment of the present disclosure.

An overview having been provided, reference is now made to FIG. 3 which illustrates operations 400 for optimizing the delivery of an email message 364 to the mobile communication device 201 in accordance with one embodiment of the present disclosure. The operations 400 may be performed by the email service 330 of the wireless connector system 120. In other embodiments, the operations 400 may be performed by a separate server connected to the wireless connector system 120.

In a first step 402, an email message 364 intended for one or more mobile communication devices 201 is received by the wireless connector system 120. The email message is typically received from a messaging server 132, which, in turn, may have received the email message from an email client or from another messaging server or mail transport agent, any of which may be internal or external to network 124. By way of non-limiting example, messaging server 132 may be realized using MICROSOFT EXCHANGE messaging server software on a commercially-available computer system, and the email client may be realized using Personal Information Management (PIM) application software, such as MICROSOFT OUTLOOK email client software running on a commercially-available computer system. However, other messaging server and email client software could also be used. The email message may be sent from any computer or mobile communication device 201 connected to transport facilities 112 such as the Internet, or to the network 124.

As will be appreciated by persons skilled in the art, many email systems construct and/or process email messages in compliance (or near compliance) with the RFC-822 standard (hereafter, "RFC-822-style messages"), in which an email message comprises a header and a message body. The header includes a number of header lines or fields. For example, the header may include 'From', 'To', 'CC', 'Subject' or 'Date' fields. Typically, the header will include at least a 'From' field, specifying the email address and optionally the name of the sender, a 'To' field, specifying the e-mail address(es) and optionally name(s) of the recipients, a 'Subject' field, containing a brief summary of the contents of the message, and a 'Date' specifying the local time and date when the message was written. Although RFC-822-style messages are described herein, various messaging systems may construct or process messages differently. The systems and methods of the present disclosure are not limited to RFC-822-messages messages and could be applied to other types of messages with no or appropriate modifications that are within the ken of those skilled in the art.

The email message 364 may be an HTML email message 364. An HTML email message contains an HTML portion within the body of the message. The HTML portion of the message comprises an HTML head section and an HTML body section. The HTML head section is denoted using the tags <head> and </head> to mark the start and end of the HTML head section, respectively. The HTML body section is denoted using the tags <body> and </body> to mark the start and end of the HTML body section, respectively.

The HTML portion of the message includes both displayable content and non displayable content, also referred to herein as markup. The displayable content includes parts of the email message 364 that are considered to be more important for transmission to a recipient of the email relative to the markup. The displayable content typically conveys information or data to the recipient of the email 364, and may for example include the text items intended by the sender to be displayed to the recipient, along with inline images, included in the email message 364.

The markup includes information that is generally not displayable content. The markup of the email message may be related to display and formatting characteristics of the displayable content of the email 364. For example, the markup may relate to font size, colours, positioning, borders, etc. Accordingly, the markup may include any tags and attributes that are related to the formatting of text in the email message 364. By way of example and not restriction, the markup of the email message may contain the font tag, <font>, which is used to define a font used to display text, the bold tag, <b>, which is used to bold the text inside the tag, the intalics tag, <i>, which is used to italicize the text inside the tag, and/or the underline tag, <u>, which is used to underline the text inside the tag. The markup portion of the email may also include the HTML header portion of the HTML email message 364 and/or comments within the HTML portion of the email message 364. Comment declarations typically take the form <! COMMENTS>, where COMMENTS may be any comment.

In some embodiments, the markup of the email message 364 contains all parts of the HTML portion of the email message 364 that are not plain text or inline images and the displayable content is defined to include the plain text and inline images of the email message 364. As will be appreciated by a person skilled in the art, an inline image is an image that is merged with text and is displayed along with the text of an HTML document. In HTML email messages, inline image data can be provided in the form of a data file that is linked in the HTML code in the HTML content—for example, the <img> </img> tag commonly are used to identify a digital data image file such as a .GIF file that can be an attachment to the linking email message.

After an email message is received in step 402, a step 404 of parsing or analyzing all email messages 364 received by the wireless connector system 120 is conducted to determine if the message is a plain text (unformatted) email message 364, or a formatted email message 364 which has been formatted using HTML or another markup language. Those email messages 364 received by the wireless connector system 120 which are formatted using HTML or another markup language are specially processed as further described.

The determination of whether an email message is formatted using HTML or another markup language may be made, for example, by parsing the email message 364 to determine whether it contains HTML content such as HTML tags. As an alternative or supplement, where the email message 364 is a Multipurpose Internet Mail Extensions (MIME) compliant email message 364, the email message may be parsed to determine whether it contains any content-type headers with a value of "text/html." As will be understood by persons skilled in the art, the MIME specification defines a series of headers for specifying attributes of an email message including the "content-type" header field (which specifies a type and subtype of the message content) and defines a set of transfer encodings, amongst many parameters for formatting email. A content-type header which is "text/html", therefore, suggests that the email message 364 includes HTML content.

The MIME specification is currently specified in six (6) Request for Comment (RFC) documents: RFC 2045, RFC 2046, RFC 2047, RFC 4288, RFC 4289 and RFC 2077; however the present disclosure is not limited to any particular version and is intended to cover all prior and future versions, revisions, supplements, additions and replacements to the MIME specification to the extent they are compatible with the teachings of the present disclosure, and to cover other email formats and specifications which may be formatted in accordance with HTML (for example, proprietary email message formats).

If the email message 364 is determined to be a plain text email message 364, then the email message 364 may not be specially processed according to steps 406 to 412 of FIG. 3. However, where the email message 364 is a plain text email message 364, other processing may be performed on the email message to optimize the email message; for example, to place it into a form more suitable for transmission to or display on the mobile communication device 201. The unformatted email 364B may then be transmitted to the mobile communication device 201 at step 414.

In some embodiments, where the email message is sufficiently small, it is not be necessary to determine whether the markup in the email is too great. That is, if the overall size of the email is small enough, then it may not matter whether a large portion of the email is eaten up by markup, since the overall bandwidth required to transmit the email is minimal. Accordingly, if the email message 364 is found to be an HTML email message 364, in optional step 406 the wireless connector system 120 determines whether the overall size of the email message is less than a predetermined threshold. The predetermined threshold may be specified by a system administrator. In other embodiments, the predetermined threshold is specified by users of the mobile communication devices 201. In such embodiments, the users may input preference information on the mobile communication device 201 using an input device such as the keyboard or keypad. In embodiments in which the threshold is related to a user's preference, the mobile communication device 201 may transmit the user's preferences upon activation of the mobile communication device 201 and/or when the user's preference is updated.

The predetermined threshold will affect the size of email messages that will be transmitted over the wireless network. That is, a greater threshold will result in larger files being transmitted over the wireless network. Accordingly, the user's preference may be related to the cost to the user for bandwidth usage. For example, a user with an unlimited data plan, in which their cost for data transmission to the mobile communication device 201 is fixed regardless of the amount of data transmitted, may prefer a higher threshold than a user without an unlimited data plan.

Where the wireless connector system 120 determines that the overall size of the HTML email message is less than the predetermined threshold, the wireless connector system 120 transmits the email message 364 in the HTML format to the mobile communication device 201.

If the wireless connector system 120 determines that the overall size of the HTML email message is greater than the predetermined threshold, the wireless connector system 120 proceeds to a step 410 of determining whether the markup of the email message 364 is too large or burdensome.

Various methods may be used to determine whether the markup is too large or burdensome such as parsing the email message 364 to determine either the amount of displayable content or the amount of markup, or both, in the email message 364 or in a part of an email message having a fixed size, which part may be considered a sample. For example, various embodiments may employ one of the following metrics: the total markup in the email message 364; the total displayable content or the total markup in a portion of the email message 364 having a fixed size; the total markup relative to the total displayable content; the total displayable content relative to the total size of the email message; or the total markup relative to the total size of the email message. These metrics may be compared with predetermined thresholds to determine whether the markup portion of the email message 364 is too great. These metrics will be discussed in more detail below.

In some embodiments, the wireless connector system 120 will determine whether the markup of the email message 364 is too great by comparing the amount of markup in the email message with the amount of displayable content in the email message. That is, emails with a larger displayable content portion will be permitted to have a greater markup portion since a greater amount of markup may be required to properly format emails having a greater amount of displayable content.

Accordingly, in one embodiment, the step 410 of determining whether the markup portion of the email message 364 is too great includes a step of parsing at least a portion of the email message 364 to determine the amount of the email message 364 that is either displayable content or markup, or the amount of both displayable content and markup. In some embodiments, the entire email message 364 may be parsed. In others, the email message 364 may be parsed until a specified limit of overall size or displayable content is reached. When the specified limit is reached, a determination may be made regarding whether the amount of markup is too great. That is, in some embodiments the determination may be made based on a sample of the email message 364 which will be considered to be a representative sample.

In embodiments in which displayable content is defined to include both the plain text and inline images, the wireless connector system 120 may determine the amount of displayable content in the email message 364 by extracting the plain text of the email message 364 and counting the number of inline images in the email message 364 and the number of plain text characters. In some embodiments, such counting will cease if a predetermined limit is reached on the overall HTML displayable content. That is, only a portion of the email message 364 will be parsed. The wireless connector system 120 may determine whether the amount of plain text and/or the number of inline images are less than predetermined thresholds. That is, the wireless connector system 120 may determine whether the displayable content is too small in relation to the markup. For example, in some embodiments, if the amount of plain text (as represented by the number of characters in the plain text) is less than a required text threshold amount, which represents a required number of characters and the number of images are less than a required image threshold, which represents a required number of images, then the wireless connector system 120 will determine that the amount of displayable content is too small (and hence, the amount of markup is too large) and will proceed to a step 414 of transmitting a reduced format email message 364B. In some embodiments, the reduced format email message 364B is a plain text or unformatted email. In some embodiments, the optimized or reduced format email message 364B may have most or a first selection of markup tags removed, while retaining a second selection of markup tags deemed to inconsequentially affect the size of the email. By way of non-limiting example, the second selection of markup tags retained could be limited to a chosen set of line break, paragraph, and text emphasis tags, such as <br>, <p>, <b>, <i>, <u>, and the corresponding closing tags.

As discussed above, the determination at step 410 regarding whether the email message 364 contains too much markup may be made by comparing the amount of markup to the amount of displayable content, such as plain text. In other embodiments, the determination at step 410 of whether the email message contains too much markup may be made by comparing the amount of markup in the HTML email directly to a predetermined threshold. If the size of the markup is above a specific threshold, then the wireless connector system 120 may determine that the amount of markup is too great and proceed to the step 414 of transferring the email message as a plain text email message. In such embodiments, the amount of markup may be determined by parsing the email message 364.

Since the total size of an email message 364 is a function of both the amount of displayable content and the amount of markup, the step 410 of determining whether the amount of markup is too great may be performed by parsing the entire email 364 to determine the relative amounts of markup or displayable content to overall size. For example, if a percentage amount of markup in comparison to the total email size is greater than a predetermined threshold, then the markup may be determined at step 414 to be too large. Similarly, a percentage amount of displayable content may be determined relative to the total email size and the wireless connector system 120 may determine that there is too much markup if the percentage amount of displayable content is less than a given threshold.

It will be appreciated that other data reference points may be used for determining whether the amount of markup is too great. For example, the wireless connector system 120 may parse the email 364 to determine both the amount of displayable content and the amount of markup. A ratio may be created to indicate the relative amount of markup to displayable content or the relative amount of displayable content to markup and the ratio compared to a predetermined threshold. The determination of whether the markup is too great may be made by examining the result of this comparison. For example, if the ratio represents the amount of displayable content in relation to the amount of markup, then a larger value is preferred and the markup will be determined to be too large if the ratio is below a specified value. However, if the ratio represents the amount of markup relative to the amount of displayable content, a smaller value is preferred and the markup will be determined to be too large if the ratio is above a specified value.

Figure 4:
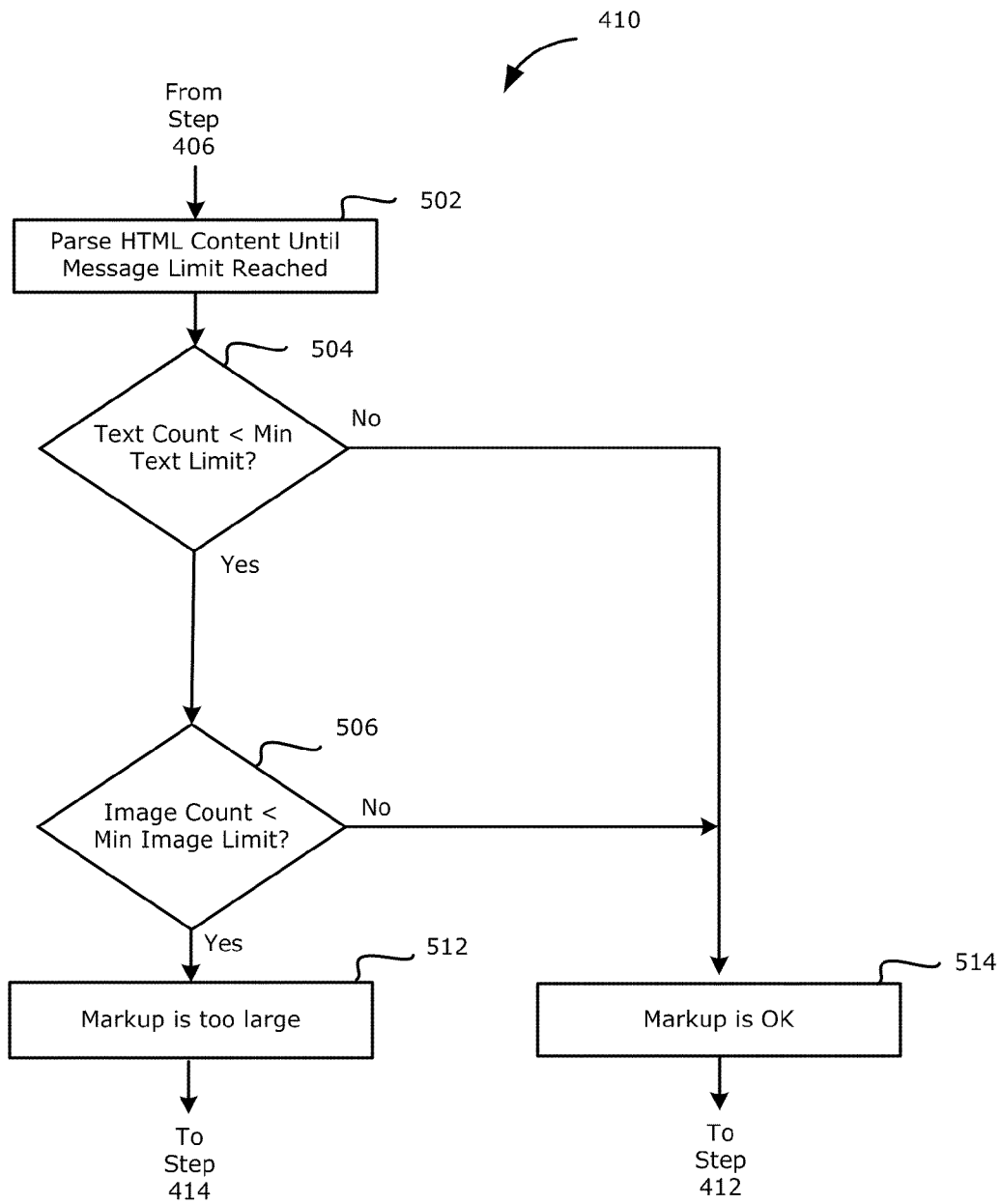
FIG. 4 is a flowchart showing a step in FIG. 3 in greater detail.

An example of one possible sub-process that can be applied in step 410 to determine if markup is too great is shown in greater detail in FIG. 4. In the process shown in FIG. 4, the HTML message content is parsed until the size of the total parsed HTML content reaches a predetermined total content size limit as indicated in step 502. The email service 330 is configured to extract a first portion of email message 364 for sending on its own as an initial wireless datagram to the mobile communications device 201 when the total email message size exceeds a certain limit, with the mobile communications device user being given the option to request more of the message if desired. In an example embodiment, the total content size limit that is applied in step 502 may conveniently correspond to the total email message size that the email service 330 applies to outgoing processed email messages 364A, such that determination step 410 is being performed on the actual amount of data that will be sent to the mobile communications device if the message is sent as an HTML message.

Although not illustrated in FIG. 4, if the end of the message is reached before parsing ends in parsing step 504, the sub-process 410 ends with a determination that the markup content is not excessive and the HTML email message is sent as per step 412 in FIG. 3. Turning back again to FIG. 4, during parsing step 502 the email service 330 counts all the displayable text that is found in the HTML content, and also counts the number of inline images that are referenced in the HTML content. In an example embodiment, the parsing is done on the HTML header and HTML body in a sequential manner starting at the beginning of the HTML content and working through the HTML elements or tag pairs one by one to count the displayable text characters as well as look for tags such as <img> tags that are indicative of inline images. In order to determine a total HTML content size, in at least some example embodiments the size of image data that will have to be sent with the HTML message is counted and the total HTML content size is set in bytes. In other example embodiments the image data is not counted, and just a number of markup characters and viewable text characters are counted, with the message size limit being set in total characters.

Accordingly, in situations where parsing process of step 502 stops by virtue of the total HTML content size limit being reached, the parsing process will provide a text count indicating how many displayable text characters were contained in the parsed portion of the email message content, and also an image count of how many inline images were present in the parsed portion of the email message content. Furthermore, the total HTML content size including both displayable content and markup is known for the parsed portion. In step 504 a determination is made whether the displayable text count for the parsed message portion meets a minimum count threshold. By way of non limiting illustrative example, in one application, the minimum text count limit could for example be 500 characters. If the text count is over the minimum text count threshold, the sub-process 410 ends with a determination that the markup content is not too large (step 514) and the content of the parsed portion of the HTML email message is sent as an HTML or otherwise formatted email message 364C per step 412 in FIG. 3.

However, if the text count is below the minimum test threshold a further content test is done at step 506 to determine if the inline image count for the parsed portion met a minimum image limit. By way of non limiting illustrative example, in one application, the minimum image count limit could for example be 5 images. If the inline image count is over the minimum image count threshold, the sub-process 410 ends with a determination that the markup content is not too large (step 514) and the content of the parsed portion of the HTML email message is sent as an HTML or otherwise formatted email message 364C per step 412 in FIG. 3.

If however in each of steps 505 and 506 the minimum limits for viewable text and viewable images are not met a decision is made that the amount of markup is too large (step 512) relative to the displayable content, and a plain text or reduced format email message 364B will be sent as per step 414 in FIG. 3.

Thus, the process shown in FIG. 4 effectively looks at the portion of the HTML message content that falls with the size limit for sending as in initial email message part to the mobile communications device 202 and determines that if that initial email message part meets either one a minimum viewable text threshold or minimum viewable content threshold than the HTML email message content can be sent. It will be appreciated that the sub-process shown in 410 can be altered in many ways—for example, as shown, only one of the minimum text or minimum image thresholds must be met in FIG. 4 to permit use of the HTML content. In some embodiments, this can be changed so that both thresholds have to be met to permit use of the HTML content. In some example embodiments, only the displayable text count may be relevant for determining if the HTML content can be sent, and in some example embodiments only the inline image count may be relevant for determining if the HTML content can be sent.

Accordingly, various methods may be used to determine whether the email message 364 contains too much markup. These methods typically involve parsing the email to determine at least one measure of the amount of markup relative to displayable content.

Turning again to FIG. 3, If the wireless connector system 120 determines that the amount of markup is not too great, then the wireless connector system 120 transmits the email message to the mobile communication device 201 in an HTML format at step 412.

However, where the wireless connector system 120 determines that the amount of markup is too great, at step 414, the wireless connector system 120 will transmit the email to the mobile communication device 201 as a plain text or reduced format email message 364B. To do so, in some embodiments the wireless connector system 120 will use plain text that has been extracted from the email message 364. The plain text may be extracted from the email message, for example, during the step 410 of determining whether the markup is too large. As explained above, in some embodiments, the plain text will be extracted during the step 410 in order to make the determination. In other embodiments, where the extraction is not performed during the step 410 of determining whether the markup is too large, an additional step of extracting the plain text from the HTML email message 364 may be included prior to transmitting the unformatted or reduced format email message 364B at step 414. In other embodiments, most or a first selection of markup tags may be removed from the message, while retaining in the optimized or reduced format message 364B a second selection of markup tags deemed to inconsequentially affect the size of the email (as compared to plain text), thereby producing an optimized HTML version of the email. For example, as mentioned above, the second selection of markup tags retained could be limited to a chosen set of line break, paragraph, and text emphasis tags, such as <br>, <p>, <b>, <i>, <u>, and the corresponding closing tags. The selection and removal or retention of tags may be performed in steps 410 or 414, for example.

Various methods of extracting plain text from an HTML email message are known. Typically, such methods involve stripping off tags in the HTML message in order to find the plain text. Since HTML tags are bounded with angle brackets, < and >, a very basic method of extracting plain text involves parsing the email to identify strings surrounded with an open angle bracket <, and a closed angle bracket, >, and removing such strings. Similar methods may be used to remove, select, and retain particular HTML or other markup tags.

Although the above description has focussed on processing HTML email messages, the methods, processes and system described above are not limited to HTML email messages and can be applied to other email message formats in which non-displayable markup content is included in the email content. Furthermore, while the current HTML specification is 4.01, the present disclosure is not limited to any particular version and is intended to cover all prior and future versions, revisions, supplements, additions and replacements to the HTML specification to the extent they are compatible with the teachings of the present disclosure. By way of non limiting example, embodiments described herein can also be applied to email messages using formatting language such as RTF (Rich Text Format), XML (Extensible Markup Language), XHTML (Extensible HyperText Markup Language), or SGML (Standard Generalized Markup Language), as appropriate.

In accordance with one embodiment of the present disclosure, there is provided a method for optimizing the delivery of email messages to mobile communication devices. The method comprises: a) receiving an email message, the email message including a displayable content portion and a markup portion; b) determining whether the markup portion of the email message is too large; c) if the markup portion is too large, extracting plain text portions of the email to obtain a plain text email (or an optimized HTML email) and transmitting the plain text (or optimized HTML) email to the mobile communication device; and d) if the markup portion is not too large, transmitting at least a portion of the email including a displayable content and markup to the mobile communication device.

In another embodiment of the present disclosure, there is provided a server for optimizing the delivery of email messages to mobile communication devices. The server includes a controller comprising at least one processor for controlling the operation of the server. The server also has an email service connected to the controller and configured to receive an HTML email message, and to determine whether a markup portion of the HTML email message is too large and to cause the communication subsystem to transmit the HTML email message if the markup portion is not too large and to cause the communication subsystem to transmit a plain text version (or optimized HTML version) of the HTML email message if the markup portion is too large.

In accordance with further embodiments of the present disclosure, there are provided a computer program product comprising a computer readable medium having stored thereon computer executable instructions comprising instructions for practising the methods of the application.

While the present disclosure is primarily described as a method, a person of ordinary skill in the art will understand that the present disclosure is also directed to various apparatus such as a mobile communication device and wireless connector system for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method, implemented by a processor of a server, for processing email messages for delivery to mobile communication devices, the method comprising:
   receiving, by the server, an email message for sending to a mobile communications device;
   determining, by the processor of the server, whether an overall size of the received email message exceeds an overall size threshold; and
   responsive to determining that the overall size of the received email message exceeds the overall size threshold,
      determining, by the processor of the server, whether markup content of the received email message exceeds a markup size threshold,
      responsive to determining that the markup content exceeds the markup size threshold,
         extracting, by the processor of the server, markup content from the received email message while retaining displayable content to obtain a reduced size email message having a size less than the overall size threshold, and
         sending, by the server, the reduced size email message.

2. The method of claim 1, wherein the displayable content includes plain text.

3. The method of claim 1, wherein extracting markup content includes extracting all markup tags from the received email message so that the reduced size email message is a plain text email message.

4. The method of claim 1, wherein extracting content includes selectively extracting markup tags so that markup tags belonging to a first group of markup tags are removed from the received email message and markup tags belonging to a second group of markup tags are retained in the received email.

5. The method of claim 4, wherein the second group of markup tags consists of the markup tags <br> and </br>, <p> and </p>, <b> and </b>, <i> and </i>, <u> and </u>, and wherein the first group of markup tags consists of all other markup tags which do not belong to the second group of markup tags.

6. The method of claim 1, wherein determining that the markup content exceeds the threshold includes parsing content of at least a portion of the received email message to determine an amount of displayable content in the parsed content and determining that the markup content exceeds the threshold if the amount of displayable content in the parsed content is less than at least one predetermined threshold.

7. The method of claim 6, wherein parsing content of at least a portion of the received email message comprises parsing only up to a predetermined amount of the received email message content if a size of the email message exceeds a size limit.

8. The method of claim 6, wherein the displayable content includes plain text content of the email message and wherein determining the amount of displayable content includes determining the number of plain text characters in the parsed content, and wherein the predetermined threshold is a predetermined number of required plain text characters.

9. The method of claim 6, wherein the displayable content includes plain text content and inline images, and wherein determining that the markup content exceeds the threshold includes determining that the amount of plain text in the parsed content is less than a predetermined displayable text threshold and determining that the number of inline images in the parsed content is less than a required image threshold.

10. The method of claim 1, wherein the received email message is an HTML (HyperText Markup Language) email.

11. The method of claim 1, wherein determining that the markup content of the email message exceeds a threshold includes comparing at least one metric to a predetermined threshold, the metric representing the amount of markup in the received email message.

12. The method of claim 1, further comprising:
determining, by the processor of the server, whether the received email message is a plain text email message or an email message formatted in accordance with a markup language; and
determining, by the processor of the server, whether the overall size of the received email message exceeds an overall size threshold responsive to determining that the email message is formatted in accordance with a markup language.

13. A server for processing email messages for delivery to mobile communication devices, the server comprising a processor executing computer-executable instructions to implement an email service operable to cause the server to:
receive, by the server, an email message for sending to a mobile communications device, the email message having a body section, the body section including displayable content and markup content;
determine, by the processor of the server, whether an overall size of the received email message exceeds an overall size threshold;
responsive to determining that the overall size of the received email message exceeds the overall size threshold,
determine, by the processor of the server, whether markup content of the received email message exceeds a markup size threshold,
responsive to determining that the markup content of the received email message exceeds the markup size threshold,
extract, by the processor of the server, markup content from the received email message while retaining displayable content to obtain a reduced size email message having a size less than the overall size threshold, and
send, by the server, the reduced size email message to the mobile communications device.

14. The server of claim 13, wherein the displayable content includes plain text.

15. The server of claim 13, wherein extracting markup content includes extracting all markup tags from the received email message so that the reduced size email message is a plain text email message.

16. The server of claim 13, wherein extracting content includes selectively extracting markup tags so that markup tags belonging to a first group of markup tags are removed from the received email message and markup tags belonging to a second group of markup tags are retained in the received email message.

17. The server of claim 13, wherein determining that the markup content exceeds the threshold includes parsing content of at least a portion of the received email message to determine an amount of displayable content in the parsed content and determining that the markup content exceeds the threshold if the amount of displayable content in the parsed content is less than at least one predetermined threshold.

18. The server of claim 17, wherein the displayable content includes plain text content of the email message and wherein determining the amount of displayable content includes determining the number of plain text characters in the parsed content, and wherein the predetermined threshold is a predetermined number of required plain text characters.

19. The server of claim 17, wherein the displayable content includes plain text content and inline images, and wherein determining that the markup content exceeds the threshold includes determining that the amount of plain text in the parsed content is less than a predetermined displayable text threshold and determining that the number of inline images in the parsed content is less than a required image threshold.

20. The server of claim 13, wherein determining that the markup content of the email message exceeds a threshold includes comparing at least one metric to a predetermined threshold, the metric representing the amount of markup in the received email message.

21. A non-transitory computer readable medium having stored thereon computer executable instructions for processing email messages for delivery to mobile communication devices, the computer executable instructions comprising code that, upon execution by a processor of a server, causes the server to:
receive, by the server, an email message for sending to a mobile communications device, the email message having a body section, the body section including displayable content and markup content;
determine, by the processor of the server, whether an overall size of the received email message exceeds an overall size threshold;
responsive to determining that the overall size of the received email message exceeds the overall size threshold,
determine, by the processor of the server, whether markup content of the received email message exceeds a markup size threshold,
responsive to determining that the markup content of the received email message exceeds the markup size threshold,
extract, by the processor of the server, markup content from the received email message while retaining displayable content to obtain a reduced size email message having a size less than the overall size threshold, and
sending, by the server, the reduced size email message to the mobile communications device.

* * * * *